United States Patent [19]
Warren

[11] 3,972,184
[45] Aug. 3, 1976

[54] CATALYTIC TREATMENT OF EXHAUST GAS RESPONSIVE TO ENGINE TEMPERATURE

[75] Inventor: Joel A. Warren, West Bloomfield, Mich.

[73] Assignee: Ethyl Corporation, Richmond, Va.

[22] Filed: Oct. 25, 1974

[21] Appl. No.: 517,870

Related U.S. Application Data

[63] Continuation-in-part of Ser. No. 245,730, April 20, 1972, abandoned.

[52] U.S. Cl. .............................. 60/288; 23/288 FA; 60/302
[51] Int. Cl.² ....................... F01N 3/14; F02B 75/10
[58] Field of Search ............. 60/288, 302, 286, 274; 23/288 FA

[56] References Cited
UNITED STATES PATENTS

| | | | |
|---|---|---|---|
| 3,150,922 | 9/1964 | Ashley | 60/288 |
| 3,273,971 | 9/1966 | Baddorf | 60/288 |
| 3,297,400 | 1/1967 | Eastwood | 60/288 |
| 3,302,394 | 2/1967 | Pahnke | 60/302 |
| 3,440,817 | 4/1969 | Saufferer | 60/288 |
| 3,646,764 | 3/1972 | Nakajima | 60/286 |
| 3,662,540 | 5/1972 | Murphey | 60/301 |
| 3,732,696 | 5/1973 | Masaki | 60/286 |

*Primary Examiner*—Douglas Hart
*Attorney, Agent, or Firm*—Donald L. Johnson; Robert A. Linn; Joseph D. Odenweller

[57] ABSTRACT

Disclosed herein is an exhaust system for an internal combustion engine including a catalytic converter. A valve-controlled by-pass around the catalyst bed in the converter is provided such that the exhaust gas is only passed through the catalyst bed during engine warm-up. The valve is automatically controlled by engine temperature such that after the engine attains operating temperature the by-pass valve opens and the exhaust gas by-passes all catalyst.

1 Claim, 6 Drawing Figures

CATALYTIC TREATMENT OF EXHAUST GAS RESPONSIVE TO ENGINE TEMPERATURE

This application is a continuation-in-part of application Ser. No. 245,730, filed Apr. 20, 1972, and now abandoned.

BACKGROUND

Catalytic converters or mufflers have been used for some time to lower the noxious constituents in exhaust gas from internal combustion engines. Such converters function by passing the exhaust gas through a catalyst bed contained within the converter. The catalyst functions by catalyzing the oxidation of the hydrocarbon and carbon monoxide constituents and the reduction or disassociation of nitrogen oxides. Frequently additional air is mixed with the exhaust gas to aid in the oxidation reactions.

By-pass means have also been used in conjunction with such a catalytic converter to provide an alternate exhaust route around the catalyst bed. The by-pass has generally been controlled by a valve responsive to either exhaust backpressure caused by a plugged catalyst bed or excessively high catalyst temperature which results when a cylinder misfires.

One of the problems associated with catalytic converters is that their useful life is not as long as required to be of practical use in reducing air pollution. Degradation of the catalyst has been attributed to many things including additives normally included in blended gasoline. Such additives include lead antiknocks and phosphate esters. Even the additives placed in lubricating oil have been recognized as a source of possible catalyst degradation. These additives include such things as the zinc dialkyldithiophosphates which perform such a useful function in extending the useful life of the lubricant and in providing good engine lubrication. Even without any of the above additives present in either the fuel or lubricant, a practical catalyst has not yet been developed which will maintain its effectiveness during use over long periods of time (e.g., 50,000 miles). If the catalyst does not become deactivated by contamination it tends to break up and crumble during long periods of use due to thermal and other effects.

SUMMARY

The present invention provides a method of greatly extending the useful life of a catalyst in a catalytic converter. This is accomplished by passing the exhaust gas through the catalyst only during the initial operating period during which the engine is below efficient operating temperature. It is during this critical period while the engine choke is partially closed that a large proportion of the noxious emissions associated with exhaust gas occurs. The amount of emissions during this period is a much greater proportion of the total automotive emissions than can be accounted for by the percentage of time during which engines are operated under such conditions. If emissions during this critical period can be reduced the overall emissions attributed to automobiles can be greatly diminished and, at the same time, the catalyst will last much longer. For example, if a catalyst is normally effective for a 10,000 mile period but is exposed to the exhausted gas during only 10 percent of the engine operation, it could last for as much as 100,000 miles. During this period, the overall reduction in emissions will be far greater than 10 percent of normal reduction obtained with the same catalyst since it is used only during high emission periods.

DESCRIPTION OF THE PREFERRED EMBODIMENTS

Figure 1:
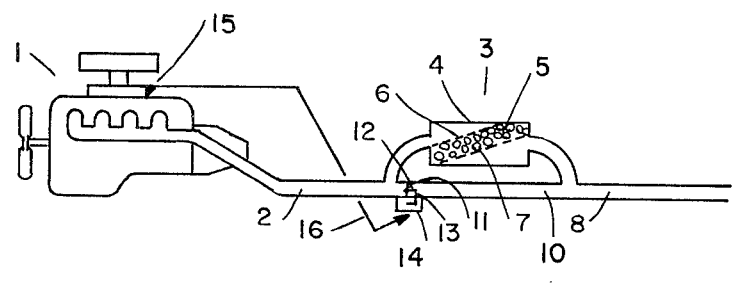
FIG. 1 is a schematic of an engine equipped with an exhaust system of this invention.

In FIG. 1, internal combustion engine 1 is connected by exhaust pipe 2 to catalytic muffler 3 formed by housing 4 and containing catalyst bed 5 between perforate retainers 6 and 7. One end of housing 4 is vented to the atmosphere through tailpipe 8. By-pass conduit 10 provides a by-pass exhaust path around muffler 3. Pivotably mounted within by-pass 10 is butterfly valve 11. The pivot shaft of valve 11 is connected through crank 12 and arm 13 to actuator 14. Mounted on the engine carburetor is temperature sensing switch 15 which is connected by signal means 16 to actuator 14.

In operation starting with a cold engine, switch 15 senses low temperature and signals actuator 14 to close valve 11. The engine is started and exhaust gas passes through pipe 2 into muffler 3 wherein it passes through catalyst bed 5. The treated exhaust gas exits through tailpipe 8. During this operation period the engine choke is at least partially closed and the unburned hydrocarbon and carbon monoxide content of the exhaust gas is much higher than normal. It can be seen that emission reduction during this critical period will weigh very heavily to the overall average reduction of exhaust emissions.

The catalyst employed in catalyst bed 5 can be any of the many catalysts known to be effective in catalyzing the oxidation of unburned hydrocarbon and carbon monoxide. These are generally metal oxides of metals from Groups V-B, VI-B, VII-B, VIII and I-B, or the Lanthanide Series of metals. These may be used alone or in a variety of combinations. A few representative examples are vanadium oxides, chromium oxide, vanadium-chromium oxides, manganese oxide, nickel oxide, chromium-manganese oxides, chromium-vanadium-manganese oxides, iron oxide, iron-manganese oxides, vanadium-molybdenum oxides, iron-cobalt oxides, copper oxide, copper-vanadium oxides, nickel oxide-palladium, copper-chromium-vanadium oxides, copper-lanthanum oxides, copper oxide-palladium, copper oxide-platinum, palladium promoted copper-vanadium oxides, platinum promoted copper-vanadium oxides, platinum, palladium, palladium promoted vanadium oxide, platinum promoted vanadium oxide, palladium promoted copper-neodymium oxides, and the like.

The catalytic materials are generally impregnated on a support material. Examples of suitable supports include alumina, silica, silica-alumina, magnesia, zirconia, kieselguhr, alumina coated iron mesh, and the like.

The catalyst can be prepared by forming an aqueous solution of a water-soluble salt of the metal and impregnating a suitable support with this solution. The impregnated support is then dried and calcined to form a useful catalyst following well-known methods.

The preferred catalysts are those having a low activation temperature such as supported palladium promoted copper oxide, platinum promoted copper oxide, platinum promoted copper-vanadium oxides, platinum, palladium, palladium promoted copper-chromium oxides, and the like. An especially useful catalyst is a silica-alumina supported palladium promoted copper oxide such as described in U.S. Pat. No. 3,224,981 and U.S. Pat. No. 3,428,573.

As the engine continues to operate it increases in temperature. Temperature is sensed by sensing means 15 which may be, for example, a bimetal electrical switch. This switch is shown mounted on the carburetor, but in practice can be located at any of a variety of locations which respond to engine temperature such as engine coolant, oil sump, and the like. Wherever it is located, it is set to supply a signal to valve actuator 14 at the time when the temperature it is sensing reaches a level at which experience has shown that the engine on which it is installed will operate efficiently with the choke valve open. By this time, the unburned hydrocarbon and carbon monoxide in the exhaust will have greatly decreased. Switch 15 then signals actuator 14, which may be a solenoid, to open valve 11. This provides a by-pass route for the exhaust gas. Since the by-pass offers less resistance to exhaust flow, the exhaust gas flows through the by-pass and avoids contact with any catalyst. If desired, a positive shut-off valve can be installed ahead of the catalyst bed to be certain that exhaust gas does not continue to pass through the catalyst bed. Operation of the engine continues without use of the catalyst converter, but by efficient design the emissions during this period are minimal.

Figure 2:
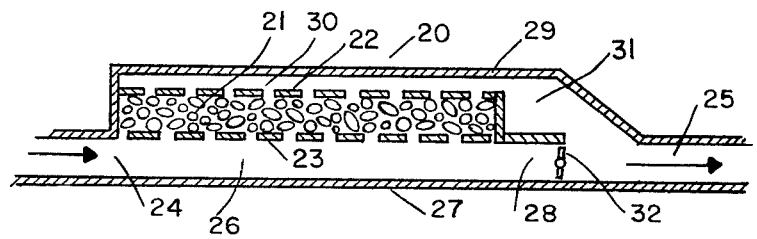
FIG. 2 is a cross-section of a catalytic converter including a by-pass conduit around the catalyst bed.

FIG. 2 shows in cross-section an embodiment in which the by-pass is located within the converter housing. It comprises a housing 20 having within it a catalyst bed 21 held between perforated retainers 22 and 23. An entry port 24 and exit port 25 are located at opposite ends of housing 20. Entry port 24 communicates with entry plenum 26 formed between retainer 23 and the lower wall 27 of housing 20. Entry plenum 26 communicates through passage 28 with exit port 25. Positioned in passage 28 is valve 32. Located between retainer 22 and upper wall 29 of housing 20 is exit plenum 30 which communicates through passage 31 with exit port 25.

The embodiment of FIG. 2 operates in a manner similar to that described in FIG. 1. On cold start, valve 32 is closed and exhaust gas entering at 24 passes into plenum 26 and through catalyst bed 21. It then enters exit plenum 30 and passes through passage 31 and exit port 25 which connects to the exhaust tailpipe. When the engine attains a predetermined efficient operating temperature, temperature responsive switch 15 signals an actuator such as 14 causing it to open valve 32. Exhaust gas then flows through passage 28 and out exit port 25, thus by-passing catalyst bed 20.

Figure 3:
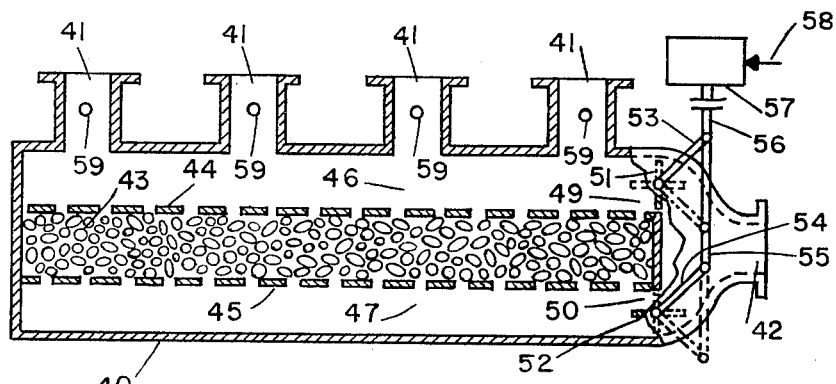
FIG. 3 is a cross-section of an exhaust manifold containing a catalyst bed and a valve control by-pass system.

In order to attain rapid activation of the catalyst bed the catalytic converter is preferably located close to the engine. FIG. 3 shows an exhaust manifold structure ideally suited to accomplish this. It comprises a manifold housing 40 having four extended exhaust gas inlets 41 adapted to bolt onto a cylinder bank of a V-8 engine and receive the hot exhaust gas. Located in each entry port is a supplemental air inlet 59 which is connected to an air source such as a belt-driven air compressor. At one end is an exhaust outlet 42 adapted to attach to an exhaust pipe. Located within housing 40 and longitudinally disposed is catalyst bed 43 held between perforate retainers 44 and 45. Retainer 44 forms an entry plenum 46 in the space between catalyst bed 43 and the wall of housing 40 in which exhaust entry ports 41 are located. Entry plenum 46 communicates with exhaust outlet 42 through by-pass passage 49. Retainer 45 forms exit plenum 47 located on the side of catalyst bed 43 opposite from entry plenum 46. Plenum 47 communicates with exhaust outlet 42 through exhaust passage 50.

Located within passage 49 is by-pass valve 51 shown in the closed position (shown open in phantom lines). Located in passage 50 is exhaust valve 52 shown in an open position (shown closed in phantom lines). Valves 51 and 52 are interlocked by control arms 53, 54 and 55 such that when one valve is open the other is closed. Connected to control arm 53 is actuating rod 56 from actuator 57, which may be a solenoid or other such suitable device. Actuator 57 is adapted to receive a signal 58 from a temperature sensor mounted on the engine such as 15 in FIG. 1.

In operation starting with a cold engine, temperature sensor 15 signals actuator 57 to close valve 51 and open valve 52. The engine is started and the exhaust gas containing a relatively high amount of hydrocarbon and carbon monoxide due to carburetor choking enters plenum 46 through inlets 41. Since valve 51 is closed, the exhaust gas passes through retainer 44, catalyst bed 43 and retainer 45 into plenum 47. To improve oxidation stoichiometry a small amount of supplemental air is injected through air inlets 59. From here, the treated exhaust gas passes through open valve 52 in passage 50 and through outlet 42 into the normal exhaust system (not shown). Because of its proximity to the engine, catalyst bed 43 rapidly reaches activation temperature and serves to catalytically oxidize unburned hydrocarbons and carbon monoxide. When the engine attains an efficient operating temperature, sensor 15 signals actuator 57 causing it to close valve 52 and open valve 51. At this time, the exhaust gas in plenum 46 passes through valve 51 in pipe 49 and enters the normal exhaust system through outlet 42.

Figure 4:
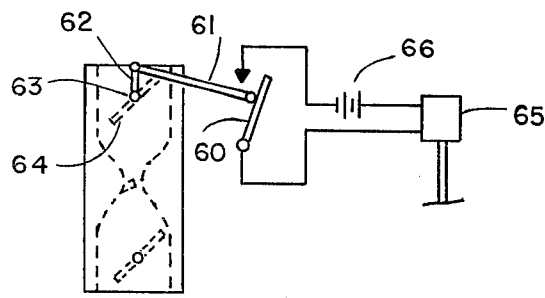
FIG. 4 is a schematic of an engine carburetor adapted to actuate an electrical switch in response to the choke valve opening. The switch provides a signal to the by-pass valve actuator.

FIG. 4 shows a signaling means useful in providing a signal to actuator 14, 57, or any other device employed to actuate the by-pass valve. It comprises an electrical switch 60 connected through arm 61 and crank 62 to the pivot shaft 63 of carburetor choke 64. Switch 60 is shown in the open position. Closing switch 60 completes an electrical circuit through valve actuator 65 and battery 66.

In operation starting with a cold engine, choke 64 is closed and crank 62 and arm 61 hold switch 60 open. Actuator 65 is spring-loaded to hold the by-pass valve closed until it receives an electrical current. As the engine warms, choke 64 opens and when it is substantially wide open, crank 62 and arm 61 close switch 60, thus completing a circuit, causing current to flow to actuator 65. Actuator 65, suitably a solenoid, supplies mechanical action and thereby opens the catalyst by-pass valve (11, 32 or 51) and, if present, closes valve 52.

The embodiment shown in FIG. 4 can conveniently be arranged in reverse so that actuator 65 is spring-loaded in a manner such that it normally holds by-pass valves 51 or 11 in an open position. In this embodiment, crank 62, arm 61 and switch 60 are modified such that switch 60 is closed while the engine is below operating temperature. Electrical current flowing through actuator 57 and working against the spring-loading operates to close by-pass valve 51 and open valve 52. When choke 64 rotates to substantially full open, crank 62 and arm 61 serve to open switch 60 and break the circuit to actuator 65. At this time, the spring-loading in actuator 65 functions to open valve 51 and close valve 52. In this manner, electric current is used only to hold the by-pass valve 51 (or 11, as the case may be) closed during the short warm-up period. From this, it can be seen that the electrical signal to the valve actuating means causing the by-pass valve to open can be provided by either the opening or closing of switch 60 in response to the rotation of choke 64.

The present invention is useful in conjunction with a thermal exhaust manifold reactor such as described in U.S. Pat. No. 2,174,626; U.S. Pat. No. 3,247,666; U.S. Pat. No. 3,302,394; U.S. Pat. No. 3,413,803; U.S. Pat. No. 3,505,028, and the like. In this embodiment, the exhaust is first exposed to thermal-induced oxidation in an enlarged insulated manifold. Air is injected proximate to the engine exhaust valves. The engine carburetor may be set to run lean or rich. In either case, the carburetor choke will provide rich operation during the first minutes of engine operation.

Figure 5:
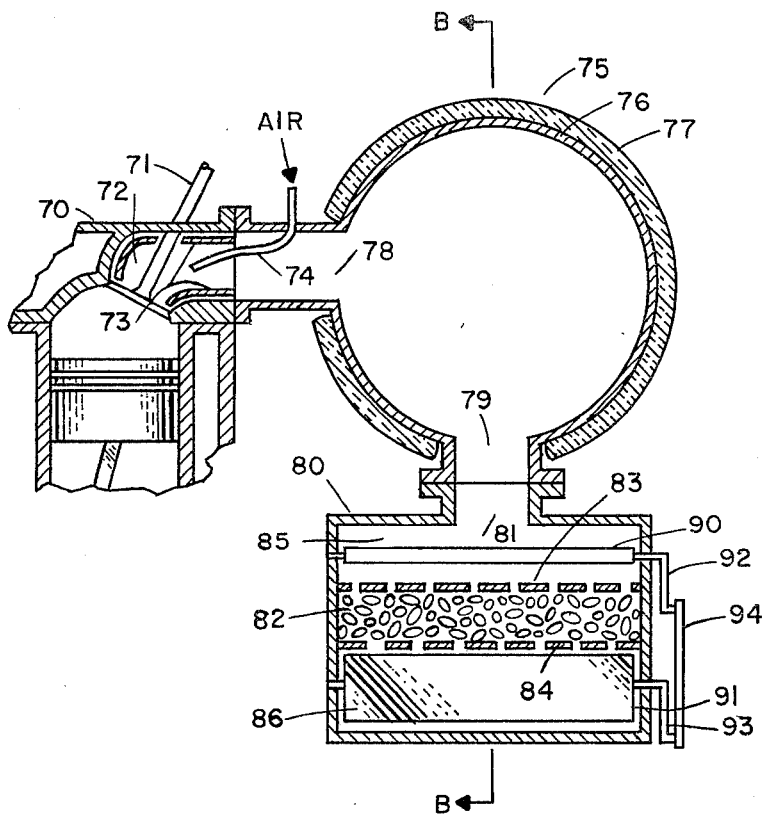
FIG. 5 is a cross-section showing the combination of a thermal oxidation reactor and a catalytic converter connected to the exhaust port of an engine and is taken generally at A—A in FIG. 6.
Figure 6:
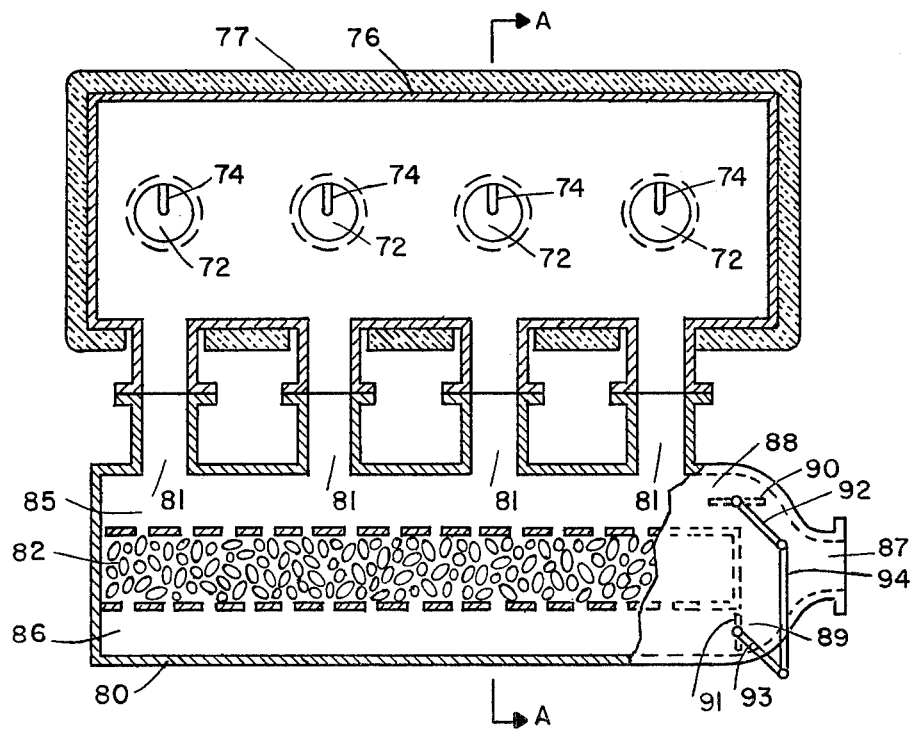
FIG. 6 is a longitudinal cross-section of the embodiment of claim 5 taken generally at B—B.

This embodiment is illustrated in FIGS. 5 and 6. Cylinder head 70 contains exhaust valve 71 in exhaust port 72. Exhaust port 72 is insulated with port liner 73. Air injector 74 extends into port 72. Attached to and in fluid communication with port 72 is exhaust reactor 75 comprising a substantially cylindrical elongated housing 76 enclosed by insulation layer 77 and having inlet 78 and outlet 79. If desired, baffles and heat shields may be positioned within housing 76 such as those shown in the above cited patents. Housing 76 is made of a material which is resistant to the extremely high temperatures caused by oxidizing unburned hydrocarbons and carbon monoxide in the exhaust gas. A suitable material is that described in U.S. Pat. No. 3,505,028.

Attached to and in fluid communication with reactor 75 is a structure similar to that shown in FIG. 3. It comprises elongated housing 80 having exhaust inlet 81 in fluid communication with the interior of reactor 75 and adapted to receive hot exhaust gas. At one end of housing 80 is exhaust outlet 87 adapted to attach to an exhaust pipe. Longitudinally disposed within housing 80 is catalyst bed 82 held between perforate retainers 83 and 84. Catalyst bed 82 divides the space within housing 80 into two plenums, entry plenum 85 and exit plenum 86. Entry plenum 85 is in fluid communication with exhaust outlet 87 through passage 88. Exit plenum 86 is in fluid communication with exhaust outlet 87 through passage 89. Located in passage 88 is valve 90 shown open. Located in passage 89 is valve 91 shown closed. Valves 90 and 91 are interlocked through cranks 92 and 93 and control arm 94 such that when one valve is open the other is closed.

In operation starting with a cold engine, a temperature sensor on the engine detects low temperature and signals valve actuating means to move arm 94 in a manner to cause valve 90 to close and 91 to open. The engine is started, and due to the low temperature, the engine choke valve is at least partially closed causing a high hydrocarbon and carbon monoxide content in the exhaust gas. The exhaust gas passes through exhaust port 72 where it is mixed with air from injection tube 74. The hot exhaust gas mixture then enters thermal reactor 75. Initially reactor 75 is not hot enough to induce adequate oxidation. The exhaust gas containing substantial amounts of hydrocarbon and carbon monoxide leaves reactor 75 at outlet 78 and enters inlet plenum 85 of housing 80 at inlet port 81. Since valve 90 is closed, the exhaust gas is forced to pass through catalyst bed 82 in which the hydrocarbons and carbon monoxide content of the gas is oxidized to harmless carbon dioxide and water. Catalyst bed 82 rapidly attains operating temperature since it is located close to the engine. The exhaust gas then enters exit plenum 86, and since valve 91 is open, passes through passage 89 and outlet 87 into the engine's normal exhaust system.

As the engine temperature rises, thermal oxidation in reactor 75 becomes increasingly efficient and, at the same time, the carburetor choke valve opens, causing leaner operation in the air/fuel range of 13–17:1. The temperature sensor then signals the valve actuating device to move arm 94 in a manner such that valve 91 closes and valve 90 opens. Under these conditions, exhaust gas entering entry plenum 85 at inlet 81 passes through passage 88 and enters the standard exhaust system at exit 87. Since valve 91 is closed, the exhaust gas does not pass through the catalyst bed. However, even without catalyst treatment, the exhaust gas is low in unburned hydrocarbons and carbon monoxide due to the efficient operation of the thermal reactor and also the fact that at this time the carburetor choke is open.

I claim:
1. An exhaust manifold catalytic converter adapted to contact exhaust gas with a catalyst bed during selected periods of engine operation and to by-pass said catalyst bed during the remaining period of engine operation, said converter comprising a housing having an exhaust entry port adapted to connect to an exhaust port of an internal combustion engine, an exhaust outlet adapted to connect to an exhaust pipe, a catalyst bed within said housing, said catalyst bed forming an entry plenum in the space between said catalyst bed and said exhaust entry port, said catalyst bed forming an exit plenum within said housing positioned on the opposite side of said catalyst bed from said entry plenum, said exit plenum communicating with said exhaust outlet through an exhaust passage, said entry plenum communicating with said exhaust outlet through a by-pass passage, a by-pass valve in said by-pass passage, an exhaust valve in said exhaust passage, valve interlock means such that when said by-pass valve is open said exhaust valve is closed and when said by-pass valve is closed said exhaust valve is open, valve actuating means operatively connected to said by-pass valve, said valve actuating means being responsive to engine temperature sensing means such that said by-pass valve is closed when said engine temperature is below a pre-determined level and opened when said engine temperature rises above a pre-determined level.

\* \* \* \* \*